United States Patent
Khan

(10) Patent No.: US 9,235,045 B2
(45) Date of Patent: Jan. 12, 2016

(54) PHOSPHOR WHEEL ILLUMINATION USING LASER LIGHT REFLECTIVE REGION

(71) Applicant: TEXAS INSTRUMENTS INCORPORATED, Dallas, TX (US)

(72) Inventor: Sajjad Ali Khan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 182 days.

(21) Appl. No.: 14/157,269

(22) Filed: Jan. 16, 2014

(65) Prior Publication Data

US 2014/0226301 A1    Aug. 14, 2014

Related U.S. Application Data

(60) Provisional application No. 61/753,367, filed on Jan. 16, 2013.

(51) Int. Cl.

| | |
|---|---|
| *F21V 9/14* | (2006.01) |
| *G02B 26/00* | (2006.01) |
| *G02B 5/30* | (2006.01) |
| *H04N 9/31* | (2006.01) |

(52) U.S. Cl.
CPC ............ *G02B 26/008* (2013.01); *G02B 5/3083* (2013.01); *H04N 9/3114* (2013.01); *H04N 9/3158* (2013.01)

(58) Field of Classification Search
CPC ... H04N 9/3158; H04N 9/3114; G02B 26/008
USPC .................................... 362/19, 293
See application file for complete search history.

(56) References Cited

U.S. PATENT DOCUMENTS

| | | | |
|---|---|---|---|
| 2009/0034284 A1* | 2/2009 | Li ........................... | G03B 33/06 362/554 |
| 2011/0211333 A1 | 9/2011 | Bartlett | |
| 2011/0242791 A1* | 10/2011 | Chen ...................... | G03B 21/14 362/84 |
| 2013/0242534 A1 | 9/2013 | Pettitt et al. | |
| 2013/0322056 A1* | 12/2013 | Konuma ................. | F21V 13/14 362/84 |
| 2015/0204514 A1* | 7/2015 | Cao ....................... | G02B 26/008 353/20 |

* cited by examiner

*Primary Examiner* — Evan Dzierzynski
(74) *Attorney, Agent, or Firm* — Michael A. Davis, Jr.; Frank D. Cimino

(57) ABSTRACT

Image projection illumination apparatus and methods are provided. A color wheel has a blue laser light reflecting region and other regions respectively coated with different color light emitting phosphors. Blue laser light of a given polarization is directed by reflection or transmission by a blue laser light polarization selective filter through a polarization changing element with changed polarization onto the color wheel. When the color wheel reflecting region is aligned with the incident light, incident light is reflected back through the polarization changing element with further changed polarization by the other of reflection or transmission by the filter for image projection. When the other regions are respectively aligned with the incident light, the different color light is emitted by the phosphors along the light path for image projection. In a described embodiment, the reflecting region has a portion coated with at least one of blue, green and cyan color producing phosphor and an uncoated reflecting portion; and aligning the reflecting region with the incident light directs both reflects incident light and phosphor emitted blue, green and/or cyan color light for image projection.

20 Claims, 2 Drawing Sheets

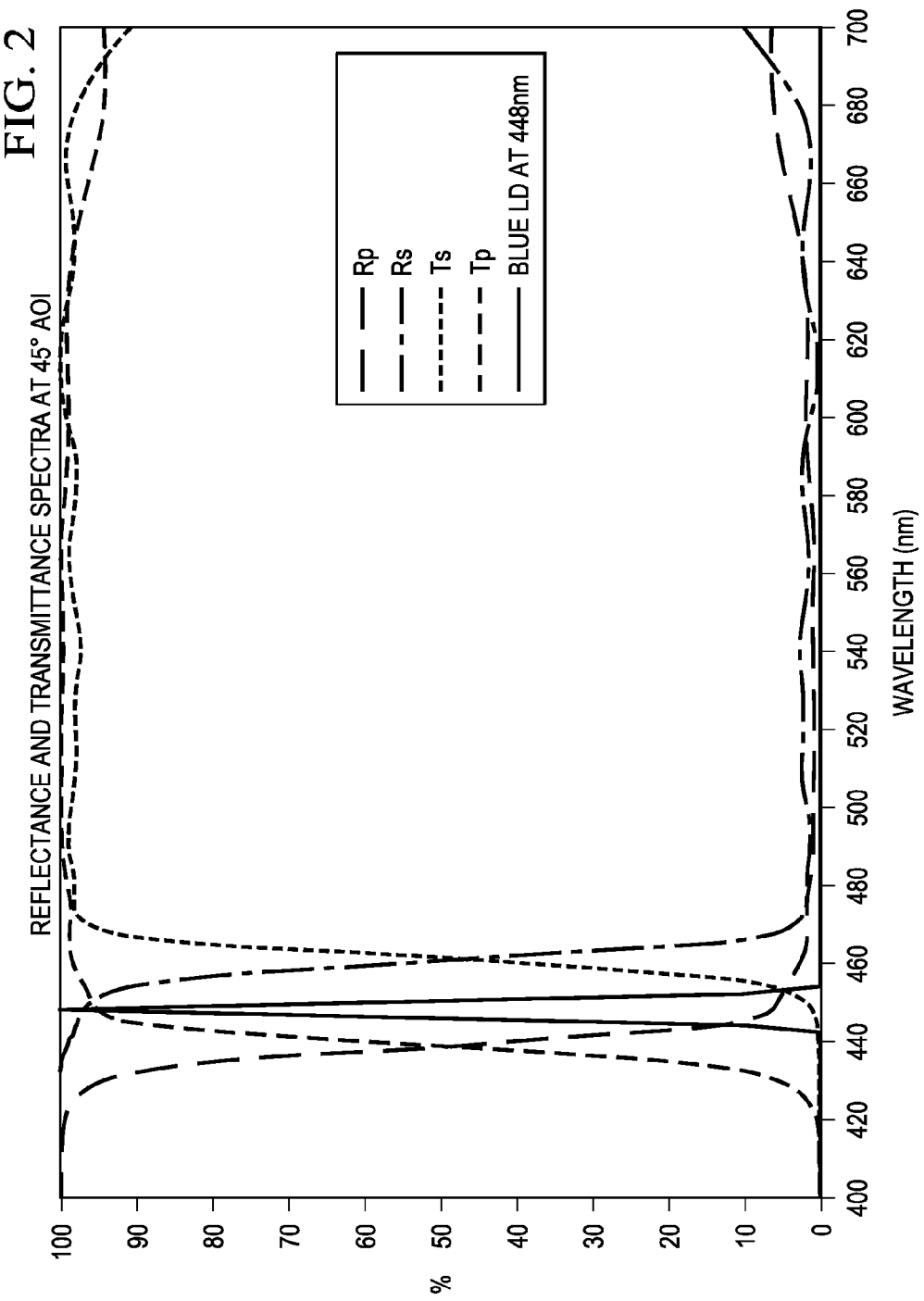

PHOSPHOR WHEEL ILLUMINATION USING LASER LIGHT REFLECTIVE REGION

This application claims the benefit of Provisional Application No. 61/753,367, filed Jan. 16, 2013, the entirety of which is hereby incorporated by reference.

BACKGROUND

This relates to generation of sequential color illumination in solid state laser projection systems and the like.

An example solid state projector using blue lasers and a phosphor color wheel as an illumination source and a spatial light modulator for modulation of the emitted light is described in Patent Application Pub. No. US 2013/0242534 A1, published Sep. 19, 2013, entitled "Projector Light Source and System, Including Configuration for Display of 3D Images," the entirety of which is incorporated herein by reference. Such system utilizes blue lasers as a direct source of blue color light and utilizes the blue lasers as an indirect source of other color light by energizing other color light producing phosphors with the blue color light from the blue lasers. Efficient blue lasers available for use in such solid state projectors are, however, often not of suitable wavelength to create a pleasing blue color when observed displayed on a screen or other display surface.

A typical phosphor color wheel as used in the described solid state projector has arcuate segments coated with different color emitting phosphors annularly positioned at circumferentially angularly spaced locations about a circular wheel. An example color wheel having circular tracks or bands of different color emitting phosphors spaced at different concentric radially spaced locations is described in Patent Application Pub. No. US 2011/0211333 A1, published Sep. 1, 2011, entitled "Wavelength Conversion," the entirety of which is incorporated herein by reference.

The use of cyan phosphor in combination with blue laser light to form a more pleasing blue in a sequential color illumination system that utilizes a blue light wraparound path is described in Application No. 61/752,294 filed Jan. 14, 2013, entitled "Method of Utilizing a Cyan Phosphor to Color Correct a Laser Illuminated Projection System," the entirety of which is incorporated herein by reference.

SUMMARY

A color sequential illumination system for image projection that uses blue laser light in a wraparound path and emitted light from blue laser light excited phosphor segments of a rotating color wheel for generation of other colors is described in application Ser. No. 13/652,129, incorporated herein. The described wraparound path, however, requires additional lenses and mirrors (five lenses and three mirrors for the arrangement illustrated in the '129 application) which adds to system volume and cost.

The instant approach utilizes dichroic materials having polarization selective properties in the laser light reflecting (viz., blue color reflecting/longer wavelength transmitting) dichroic filter to improve the appearance of blue color without the need for a long wraparound path. In one implementation, 3 dB cutoff points for the dichroic filter are chosen based on the laser polarization and dichroic properties. In one approach, an enhanced blue color may be obtained utilizing a thin layer of blue/cyan/green phosphor material to modify the blue color point. This enables availability of a wider color gamut than with use of blue laser diode alone.

The described implementation enables a blue color illumination at lower cost (eight optical components and mechanics) in a smaller size and volume than illumination systems using a longer wraparound path for blue laser light redirection. Use of a thin layer of phosphor material together with the blue laser for generation of the blue color enables a more visually pleasing blue and wider color gamut than obtained with blue laser light redirection alone. Speckle and scintillation may be reduced by using a diffuse reflective surface for the blue segment instead of a flat surface. A thin layer of green/cyan/blue phosphor should also help. It may be that the described implementation will also result in fewer blue pump watts needed as the blue segment size may be reduced to allow for more time for other colors, giving lower cost and higher lm/W efficiency.

In the described implementation, a dichroic filter is used that is shifted left (e.g., shifted by 39 nm towards shorter wavelength) as compared to a same type filter used in a standard arrangement.

BRIEF DESCRIPTION OF THE DRAWINGS

FIG. 2 illustrated reflectance and transmittance spectra for an example 45° angle dichroic filter usable with the illumination system of FIG. 1.

DETAILED DESCRIPTION OF EXAMPLE EMBODIMENTS

Figure 1:
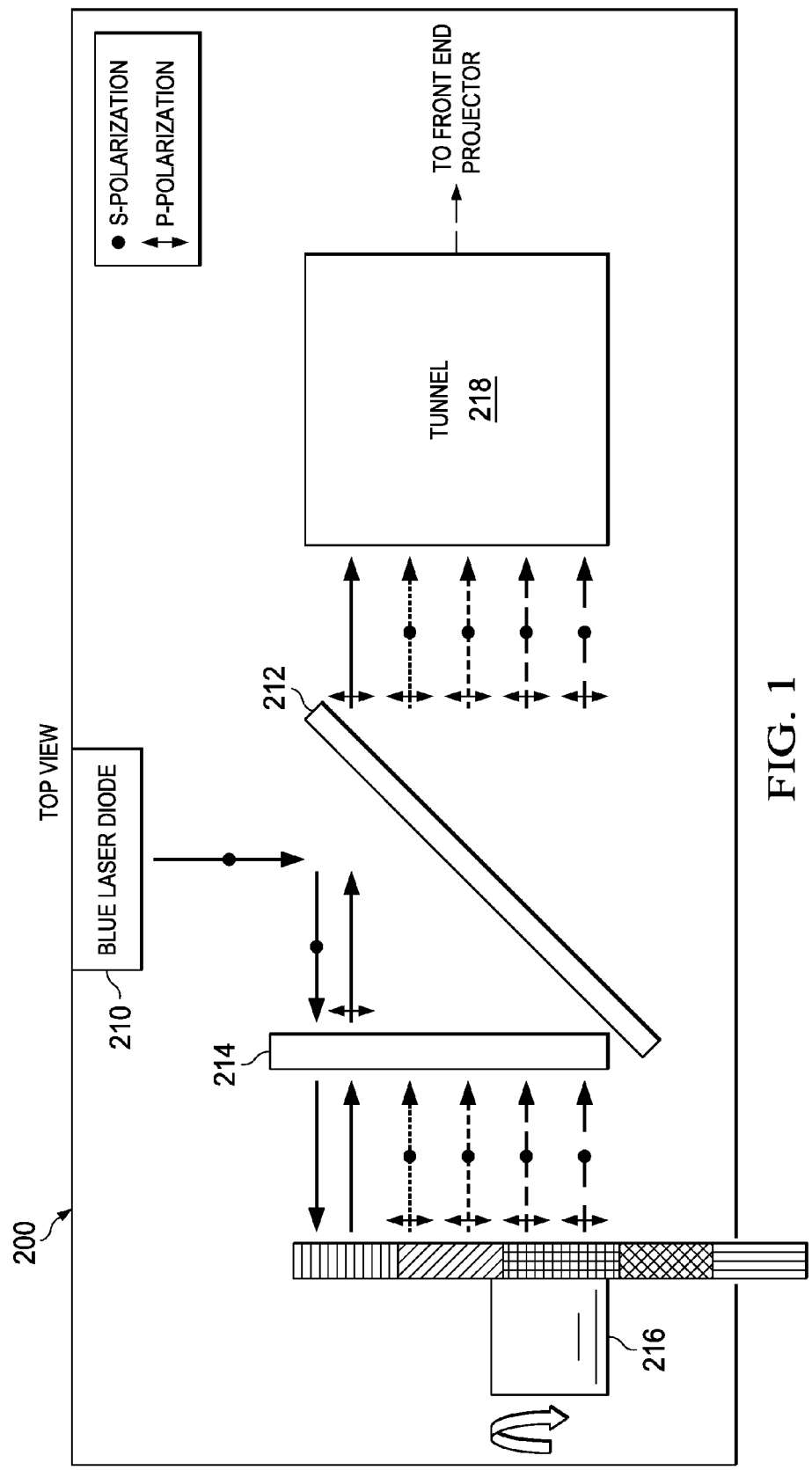
FIG. 1 illustrates an example illumination system embodying aspects of the principles disclosed herein.

FIG. 1 illustrates an example illumination system 200.

Blue light emitted from a blue laser diode source 210 is directed to a 45° oriented dichroic filter 212. The reflectance and transmittance spectra for 45° angle of incidence for the filter 212 is illustrated in FIG. 2. The blue laser beam incident at 45° on filter 212 from source 210 is S-polarized and is strongly reflected by the filter 212. The reflected blue laser light passes through an achromatic quarter-wave plate (QWP) 214, shown vertically oriented at 45° to the filter. After transmission through the quarter-wave plate 214, the laser light is incident on a color wheel 216.

The color wheel 216 includes segments of different color light emitting phosphors, such as the different color light emitting phosphors of the respective angularly spaced segments described in connection with the color wheel illustrated in the '129 application. (The color wheel may, alternatively, include the different color light emitting phosphors in segments such as the rings or bands described in Patent Application Pub. No. US 2011/0211333 A1, or some other arrangement.) The color wheel 216 illustrated in FIG. 1 has a reflective, e.g. aluminum, front surface with different regions coated with respective different ones of the different color light emitting phosphors. By way of example, color wheel 216 may have regions with respectively green, yellow and red color emitting phosphors. In an embodiment, the red color emitting phosphors may be broadband red color light emitting phosphors. Instead of clear area segments for transmitting incident blue laser light through the color wheel 216, color wheel 216 is provided with reflecting segments that reflect the incident blue laser light back from the color wheel 216.

When the color wheel 216 is aligned so that blue laser light reflected off filter 212 and passing through the quarter-wave plate strikes a segment of the reflective wheel surface that is coated with color emitting phosphor, the phosphor is energized to emit light of the specified color back through the quarter-wavelength plate 214 and through the filter 212 for collection by a light tunnel 218 and (or) other components of downstream projection optics for generation of a displayed image. When a non-phosphor coated reflecting segment of the wheel surface is aligned with the incident blue laser light, the laser light is reflected off the color wheel 216 back through the quarter-wavelength plate 214 and onto the filter 212. The passage of the laser light through the quarter-wave plate 214 first in the color wheel incidence direction (to the left in FIG. 1), and then again in the color wheel reflectance direction (to the right in FIG. 1) converts the S polarization of the incident beam to P polarization in the reflected beam. The dichroic filter materials are selected to enable reflection of the incident S-polarized light from the blue laser diode to the quarter-wave plate 214 by filter 212 in the one direction, but transmission of the incident P-polarized light reflected off the color wheel 216 to the quarter-wave plate 214 by filter 212 in the other direction. Because the different colored lights emitted by phosphor coatings at other segments of the color wheel 216 are non-coherent emissions and of longer wavelength than the lower wavelength cutoff of the filter 212, they are transmitted through filter 212 without significant reflection away from the projection optics. Because the dichroic materials of filter 212 are chosen to reflect the S-polarization but pass the P-polarization, the P-polarized light generated by reflection off color wheel 216 and (second) passage through the quarter-wavelength plate 214 is also transmitted through the filter 212 without significant reflection away from the projection optics. A shown by the filter reflectance/transmission profile in FIG. 2, the P-polarized bean is strongly transmitted through the dichroic filter 212 and experiences a high transmission coefficient, as shown by the dashed curve in FIG. 2.

To enhance the blue light emission for, e.g., pulse-width modulation (PWM) spatial light modulation (or other image forming process) image production in blue light illumination time segments of the color illumination sequence, the blue light reflecting segments of the color wheel 216 may be coated with a blue, green and/or cyan color producing phosphor applied leaving portions of the reflecting surface uncoated. A more pleasing blue color point may, for example, be obtained by utilizing a cyan light emitting phosphor in combination with the blue laser light as the blue color light. Moreover, using the cyan light emitting phosphor in combination with the blue laser light may lessen the need for a diffuser for dithering the otherwise coherent nature of the P-polarized laser light. Such combination will produce both blue and green color components of an emitted cyan color, of which the green color component and a non-blocked polarization portion of the blue component will be passed to the projection optics along with the reflected P-polarized blue laser light.

A small amount of either phosphor material and/or diffuser material used in the blue reflecting segment of color wheel 216 will help in homogenizing the blue light reflected toward the projection optics. The phosphor material and its thickness utilized in the reflecting segment may be chosen such that emission wavelength>excitation wavelength.

The described implementation has no cut-out in the aluminum based phosphor coated color wheel. An all-reflective generation of illumination avoids the need for a wraparound path for the blue laser light utilized during blue color time segments, thereby enabling a more compact design.

Those skilled in the art will appreciate that modifications may be made to the described example embodiments, and also that many other embodiments are possible, within the scope of the claimed invention.

What is claimed is:

1. An illumination apparatus for image projection, comprising:
   a source of blue laser light;
   a movable color wheel having a blue laser light reflecting region and other regions respectively coated with different color light emitting phosphors;
   a filter having blue laser light polarization selective reflectance and transmittance properties; and
   a polarization changing element;
   wherein the source, color wheel, filter and polarization changing element are relatively positioned and configured so that:
      blue laser light of a given polarization emitted by the source is directed by one of reflection or transmission by the filter through the polarization changing element and incident with changed polarization onto the color wheel;
      movement of the color wheel aligning the reflecting region with the incident light reflects incident light back through the polarization changing element and directs the reflected incident light with further changed polarization by the other of reflection or transmission by the filter along a light path for image projection; and
      movement of the color wheel respectively aligning the other regions with the incident light emits the different color light by the phosphors along the light path for image projection.

2. The apparatus of claim 1, wherein the reflecting region has a portion coated with at least one of blue, green and cyan color producing phosphor and an uncoated reflecting portion; and wherein the movement of the color wheel aligning the reflecting region with the incident light both reflects incident light and emits at least one of blue, green and cyan color light by the phosphor.

3. The apparatus of claim 2, wherein the movement of the color wheel respectively aligning the other regions with the incident light emits the different color light by the phosphors by the other of reflection or transmission by the filter along the light path for image projection.

4. The apparatus of claim 3, wherein the movement of the color wheel respectively aligning the other regions with the incident light emits the different color light by the phosphors through the polarization changing element.

5. The apparatus of claim 4, wherein the one of reflection or transmission is reflection.

6. The apparatus of claim 5, wherein the filter is a dichroic filter.

7. The apparatus of claim 6, wherein the polarization changing element is a quarter-wave polarization changing element.

8. The apparatus of claim 7, wherein the polarization changing element is a quarter-wave plate.

9. The apparatus of claim 8, wherein the given polarization is one of S- or P-polarization and the further changed polarization is the other of S- or P-polarization.

10. The apparatus of claim 9, wherein at least some of the reflecting and other regions are arcuate segments annularly positioned at circumferentially angularly-spaced locations about the color wheel.

11. The apparatus of claim 10, wherein the other regions coated with different color light emitting phosphors comprise one or more regions respectively coated with green, yellow or red color emitting phosphors.

12. The apparatus of claim 9, wherein at least some of the reflecting and other regions are bands spaced at different radially spaced locations on the color wheel.

13. The apparatus of claim 1, wherein the movement of the color wheel respectively aligning the other regions with the incident light emits the different color light by the phosphors through the polarization changing element and by the other of reflection or transmission by the filter along the light path for image projection.

14. The apparatus of claim 1, wherein the filter is a dichroic filter, and the one of reflection or transmission is reflection.

15. The apparatus of claim 1, wherein the polarization changing element is a quarter-wave plate, the given polarization is one of S- or P-polarization, and the further changed polarization is the other of S- or P-polarization.

16. The apparatus of claim 1, wherein the color wheel is a circular color wheel, and the reflecting and other regions are arcuate segments annularly positioned at circumferentially angularly-spaced locations about the circular color wheel.

17. The apparatus of claim 1, wherein the color wheel is a circular color wheel, and the reflecting and other regions are bands spaced at different concentric radially spaced locations on the circular color wheel.

18. A method of providing illumination for image projection, comprising:
   providing a color wheel having a blue laser light reflecting region and other regions respectively coated with different color light emitting phosphors;
   providing a filter having blue laser light polarization selective reflectance and transmittance properties;
   directing blue laser light of a given polarization from a light source by one of reflection or transmission by the filter through a polarization changing element and with changed polarization onto the color wheel;
   moving the color wheel to align the reflecting region with the incident light to reflect incident light back through the polarization changing element and with further changed polarization directing the reflected incident light by the other of reflection or transmission by the filter along a light path for image projection; and
   moving the color wheel to respectively align the other regions with the incident light to emit the different color light by the phosphors along the light path for image projection.

19. The method of claim 18, wherein the reflecting region has a portion coated with at least one of blue, green and cyan color producing phosphor and an uncoated reflecting portion; and moving the color wheel to align the reflecting region with the incident light both reflects incident light and emits at least one of blue, green and cyan color light by the phosphor.

20. The method of claim 18, wherein moving the color wheel to respectively align the other regions with the incident light emits the different color light by the phosphors through the polarization changing element and by the other of reflection or transmission by the filter along the light path for image projection.

* * * * *